(12) United States Patent
Davis et al.

(10) Patent No.: US 8,818,439 B2
(45) Date of Patent: *Aug. 26, 2014

(54) SYSTEMS, METHODS, AND MACHINE-READABLE MEDIA PROVIDING LOCATION-ENABLED GROUP MANAGEMENT

(71) Applicant: QUALCOMM Incorporated, San Diego, CA (US)

(72) Inventors: Richard P. Davis, Escondido, CA (US); Kristin W. Peri, Portland, OR (US); Thomas Francis Doyle, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/044,788

(22) Filed: Oct. 2, 2013

(65) Prior Publication Data

US 2014/0031073 A1 Jan. 30, 2014

Related U.S. Application Data

(63) Continuation of application No. 12/797,547, filed on Jun. 9, 2010, now Pat. No. 8,577,405.

(60) Provisional application No. 61/186,612, filed on Jun. 12, 2009.

(51) Int. Cl.
*H04B 7/00* (2006.01)
*H04W 4/10* (2009.01)

(52) U.S. Cl.
USPC ......... 455/518; 455/456.3; 455/517; 455/520

(58) Field of Classification Search
USPC .............. 455/452.1, 509, 517, 519, 518, 520, 455/456.1, 456.3, 415, 414.1, 67.11, 463; 709/205; 370/432
See application file for complete search history.

(56) References Cited

U.S. PATENT DOCUMENTS 8,577,405 B2 11/2013 Davis et al.
2001/0054043 A1 12/2001 Harlan
(Continued)

FOREIGN PATENT DOCUMENTS

CN 1961588 A 5/2007
EP 1379048 A1 1/2004
(Continued)

OTHER PUBLICATIONS

International Search Report and Written Opinion—PCT/US2010/038388, International Search Authority—European Patent Office—Feb. 16, 2011.

(Continued)

*Primary Examiner* — John J Lee
(74) *Attorney, Agent, or Firm* — Arnold J. Gum

(57) ABSTRACT

A computer-executed method for managing a group of entities includes receiving an indication from a first user indicating a desire to add members to the group based on proximity to a target, such as a point of interest (POI) or a location of a person. The method also includes sending an invitation to a prospective group member based on a location of the prospective group member during a time window associated with the target. In response to the invitation, an indication is received from the prospective group member as to whether the prospective group member desires to join the group.

20 Claims, 3 Drawing Sheets

(56) References Cited

U.S. PATENT DOCUMENTS

| | | | |
|---|---|---|---|
| 2002/0090954 A1* | 7/2002 | Tanaka et al. | 455/517 |
| 2003/0007464 A1 | 1/2003 | Balani | |
| 2006/0111135 A1* | 5/2006 | Gray et al. | 455/519 |
| 2007/0161402 A1 | 7/2007 | Ng. et al. | |
| 2008/0250025 A1 | 10/2008 | Abhyanker | |

FOREIGN PATENT DOCUMENTS

| | | |
|---|---|---|
| EP | 1480473 A2 | 11/2004 |
| JP | 2008539528 A | 11/2008 |
| JP | 2010015565 A | 1/2010 |
| JP | 2010500665 A | 1/2010 |
| TW | 200427282 | 12/2004 |
| WO | WO-2006020653 A2 | 2/2006 |

OTHER PUBLICATIONS

Partial International Search Report—PCT/US2010/038388—International Search Authority, European Patent Office, Oct. 6, 2010.

Taiwan Search Report—TW099119314—TIPO—Jul. 9, 2013.

* cited by examiner

SYSTEMS, METHODS, AND MACHINE-READABLE MEDIA PROVIDING LOCATION-ENABLED GROUP MANAGEMENT

CROSS-REFERENCE TO RELATED APPLICATION

This application is a continuation of U.S. application Ser. No. 12/797,547, entitled "Systems, Methods, and Machine-Readable Media Providing Location-Enabled Group Management," filed Jun. 9, 2010, which claims the benefit of U.S. Provisional Patent Application No. 61/186,612, filed Jun. 12, 2009, and entitled "LOCATION-ENABLED GROUP MANAGEMENT," both of which are assigned to the assignee hereof and are expressly incorporated herein by reference.

BACKGROUND

1. Background Field

This disclosure generally relates to managing group parameters using location information and, more specifically, to creation and management of groups based on location.

2. Relevant Background

Many people are connected to others by virtue of their skills, interests, obligations, or other characteristics. In some cases, a person chooses to be affiliated with a particular organized group. In others, a person can be grouped with others according to the person's characteristics, such as a person's skill set or experience.

Modern technology enables group related activities on a significantly expanded scale. Prior to the Internet, it was much more difficult to find, join, and interact with groups. Today, with network-based social applications such as MySpace™ and Facebook™, users can create, find, and join groups spanning substantially all interests and all locations.

SUMMARY

In one aspect, a computer-executed method for managing a group of entities is disclosed. The method includes receiving an indication from a first user indicating a desire to add members to the group based on proximity to a target and sending an invitation to a prospective group member based on a location of the prospective group member during a time window associated with the target. The method also includes receiving an indication from the prospective group member, in response to the invitation, that the prospective group member desires to join the group.

In another aspect, a tangible machine-readable medium comprising instructions, which, when executed by a machine, cause the machine to perform operations is disclosed. The instructions include code to receive a command from a first mobile device user to add members to a social group using geolocation as a factor. The instructions also have code to provide a membership opportunity to a second mobile device user, at least in part, in response to the received command during a time window associated with the geolocation factor and code to receive input from the second mobile device user indicating a desire to join the social group.

In yet another aspect, a computer system is disclosed. The computer system includes a first module for interacting with a first mobile device user and receiving input from the first mobile device user requesting that the computer system add members to a social group based on proximity to a target. A second module interacts with a second mobile device user and offering an opportunity for membership in a plurality of social proximity groups during a time window associated with the target. The plurality of social proximity groups include the social group. A third module adds the second mobile device user as a member of the social group in response to input from the second mobile device user requesting to join the social group.

In another aspect, a computer system includes means for interacting with a first mobile device user and receiving input from the first mobile device user requesting that the computer system add members to a social group based on proximity to a target. The computer system also has means for interacting with a second mobile device user and offering an opportunity for membership in a plurality of social proximity groups during a time window associated with the target. The plurality of social proximity groups includes the social group. The computer system includes means for adding the second mobile device user as a member of the social group in response to input from the second mobile device user requesting to join the social group.

In yet another aspect, a tangible machine-readable medium comprising instructions, which, when executed by a machine, cause the machine to perform operations is disclosed. The instructions include code to administer a network-based social group with a plurality of users, code to obtain geolocation information associated with the plurality of users, and code to apply at least one filter to the geolocation information to identify a spatial point of interest of the network-based social group.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
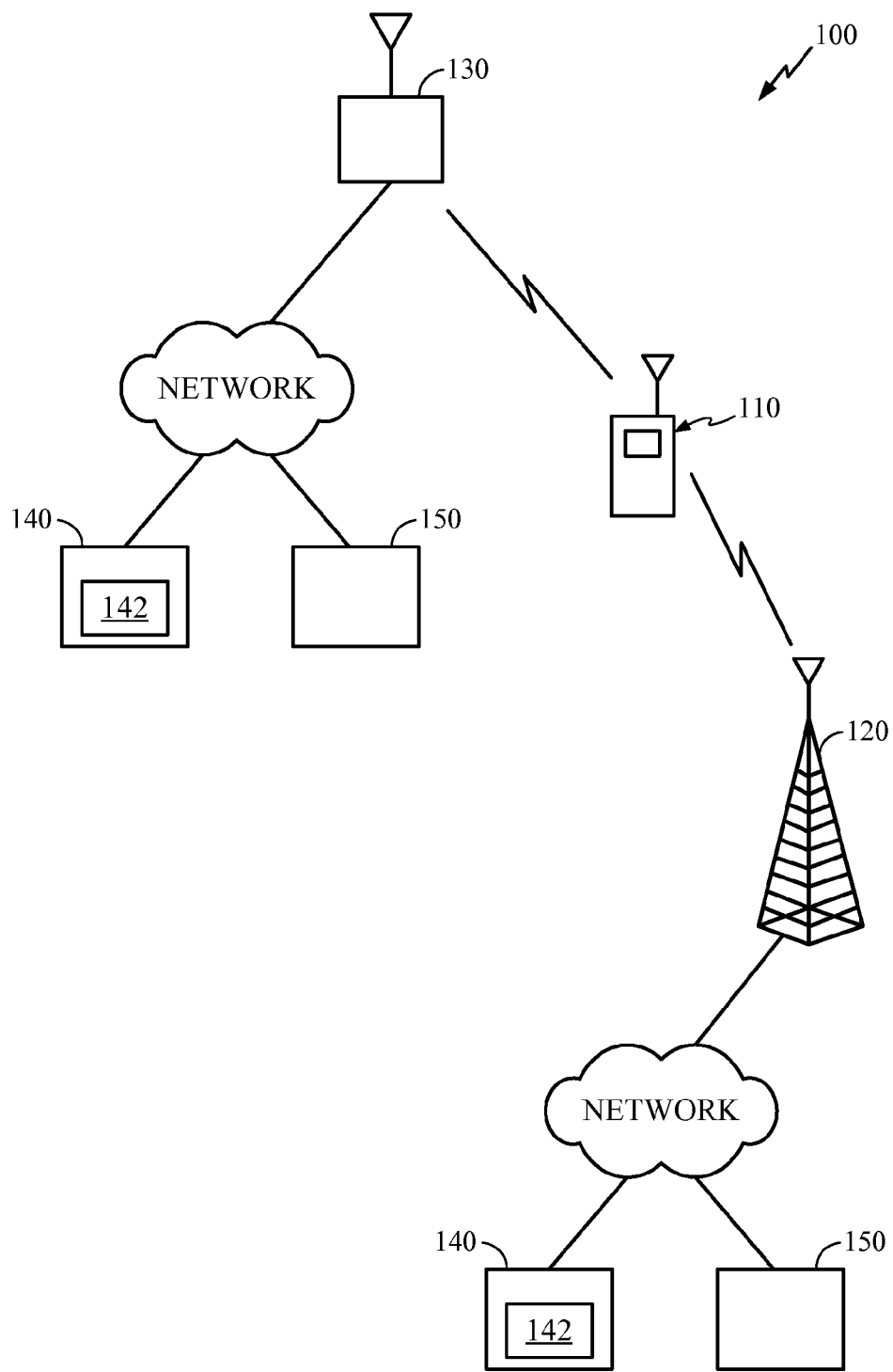
FIG. 1 is a simplified block diagram of a communication network of the disclosed systems and methods.

Systems, machine-readable media, and methods disclosed herein provide for managing groups using position information. In some aspects, position information can be used to determine that a device associated with a group member is in a location associated with group information that is different than the group information for a previous location. The user can be provided with an indication that new group information is available based on the provided position information.

It should be noted that location information provided by common positioning methods such as GPS may also contain a timestamp, and typically includes additional information such as speed and direction of movement. The terms "location" or "position" in this document shall be understood to include at least a timestamp in addition to spatial coordinates, and in some cases application of additional information such as speed/direction will also be discussed for those instances where this information may be available.

It should also be noted that location information varies in precision, based on technology used and the conditions when a location is determined. In common location determination technologies such as GPS, an estimate of the precision of location information may be available with a location. The precision information may be used in algorithms to determine proximity of two entities. Using the precision information, the probability of two entities being within a prescribed proximity can be determined, and this probability can be compared to thresholds to determine what actions to take in the application.

In some aspects, group attributes can be stored and used to determine locations of interest for a group. Position information can be obtained for one or more group members over time. Based on the position information, a particular location can be determined to be a candidate location of interest for the group. One or more group members can be queried to confirm whether the particular location is a location of interest for the group. The location of interest can be assigned a name or other identifier. Advantages of such embodiments may include more accurate identification of points of interest, even with less user input.

Alternatively, a location of interest might only be relevant to a group at certain times. For example, a sports field might be used for football practice at certain times, and soccer practice at other times. Therefore, association with a group can have a temporal parameter in addition to location.

In some aspects, one or more groups may be created based on proximity. Potential group members may be identified using position information (determined using positioning techniques or based on user input of location), based on their proximity to (for example) a device associated with a user creating a proximity group. Potential group members may receive information indicative of an invitation to join the proximity group. A group creator or other entity may review potential new members to confirm or deny an invitation to join the group, could block undesired users from becoming group members, or may remove undesired members from the group, or may take other actions to manage the group. Alternate enrollment techniques can be provided. Advantages of such embodiments may include more relevant and convenient creation of social groups by using proximity information or geolocation information as a factor.

In some aspects, one or more proximity groups may be created using both position and time constraints. A group creator can access an application indicating the desire to create a proximity group. Position and timestamp information for the creator can be associated with the proximity group. The position and timestamp information for other devices can be compared to that of the group creator, and depending on proximity in space and time, potential members can be identified. Optionally, a timer can start, opening a proximity window during which members can join the proximity group. Potential members can access the application during the proximity window, and select the group they want to join. Even if the position of the creator and/or one or more of the potential group members is not precisely known, by limiting the group creation in both position and time, potential group members can select from a limited number of potential groups (most likely a single potential group). Users can select the appropriate proximity group, and the creator can confirm, block, or otherwise manage the group membership. Alternate enrollment techniques can be provided. Alternatively, the position and timestamp of other pre-existing group members (in addition to the creator) can be used to establish a "cluster" of members. The cluster can be analyzed in both space and time, with various techniques such as the average and standard deviation of the locations and timestamps. Other techniques can be used including the minimum and maximum values of location and timestamp, or other techniques. Once the cluster analysis is done, the location and/or timestamp of other entities that are not already group members can be compared to the range of the cluster, and potential new members identified based on comparison to the range. Optionally, the precision information can be used when analyzing the ranges of the cluster, and/or the precision information can be used for the potential new members when comparing to the range of the cluster. Depending on the probabilities associated with the precision information, the likelihood that a potential new member is within the range of the cluster can be determined, and those above a certain probability can be invited to join the group.

Additional techniques can optionally be included in the algorithms for determining potential new group members. For example, if a potential new group member was within the range of the cluster (space/time), but was moving at a high rate of speed during the time of being in proximity, the likelihood of group membership is lower. Similarly, the dwell time while in the range of the cluster can be used to increase confidence of group membership. For example, if the cluster of the group spans a certain area in space during a one hour time window, and a potential new group member was in that area for 50 minutes of that time, it is more likely that they are a valid group member than if they dwelled in that area for 10 minutes of the hour.

Systems and techniques herein provide for location-enabled group management. As noted above, individuals can have skills, interests, obligations, and/or other characteristics that lead to membership or inclusion in groups. In an individual's local environment, he or she usually develops group contacts over time. As a result, the individual sets up a personal information environment to have access to the appropriate group information as needed.

A person can participate in a particular group using an application such as the social networking site Facebook™, the group's web site or email group, personal contact with group members, the mail, or any other communication method. Participation is generally set up around the person's primary location (usually home), because geospatial proximity is often a meaningful element in group identity. Large service organizations, for example, may have localized affiliations. If someone has a specific interest, such as in a particular musician or activity, it may be more meaningful to interact with others who are nearby, either to share local knowledge or to coordinate a particular group activity—e.g., a concert, or bike ride.

While the Internet reduces limitations to interaction caused by physical distance, it is telling that many very active portals are organized to recognize the inherent meaningfulness of location—Craig's List™, Evite™, and CitySearch™, for example; not only as local indices, but to foster and facilitate non-web based activities.

Currently, different techniques may be used when an individual's location changes. In some contexts, it is fairly easy. One can present one's credentials at the new local affiliate, transfer membership, or browse to a different location on the Web.

However, even these techniques can present challenges. For example, it is possible to research location-specific Internet sites and group contacts prior to a trip, but doing so takes effort and forethought. Additionally, it can be much more challenging and time consuming to identify and gain access to a new social group or network.

Various embodiments use the fact that mobile phones may have a one to one association with an individual (in contrast to residential land lines), so that it is possible to combine that individual's group affiliations based on geolocation information for a user's mobile phone. For example, if a person has an attribute as Grateful Dead fan, that person could automatically be added to a Chicago-area Grateful Dead interest group upon arrival on a tourist visit to Chicago and thus could learn about a bootleg recording swap happening in the Loop that evening. Thus, such embodiments employ additional parameters beyond space/time for the "matching" functions.

In another example embodiment, a person with a particular skill will generally be known in his or her primary location, so that anyone in need of the skill will know how to contact the person. However, when the person is traveling or relocates, contact is more difficult. For example, a surgeon with an unusual medical specialty could be called upon by nearby medical facilities while on travel.

FIG. 1 shows a system 100 for location enabled group management, according to some embodiments. A mobile device 110 is associated with a particular user, and communicates with a base station 120 of a cellular network associated with the user's mobile service provider. The mobile device 110 may also be configured to communicate with one or more devices 130 (e.g., wireless access points) of a short range wireless network using a wireless interface and communication protocol such as WiFi, Bluetooth™, etc.

Associated with the cellular and short range networks is one or more network devices 140 including a memory 142 storing group attributes associated with the particular user. In some implementations, the network device 140 can be associated with the user's mobile service provider, or can be associated with an application separate from the mobile service provider (e.g., a server affiliated with social networking application Facebook™ or other application).

The system 100 further includes a location server 150 that can be used in some implementations. The location server 150 can be used in some implementations of the current disclosure; particularly when location is determined using an assisted satellite positioning technique (for example, assisted global positioning system (A-GPS)). The location server 150 can provide assistance information to the mobile device 110, can perform position determination using pseudorange information from the mobile device 110, and/or perform other assistance functions. The location server 150 can provide location information to the mobile device 110 and/or to the network device 140. Although the example illustrated in FIG. 1 shows both a network device 140 and a location server 150 associated with a cellular network and a short range wireless network, many implementations are possible. For example, the location server 150 associated with the short range wireless network in FIG. 1 may be omitted.

While the mobile device 110 is shown as a cellular phone, the scope of embodiments is not so limited. As used herein, a mobile device refers to a device such as a cellular or other wireless communication device, personal communication system (PCS) device, personal navigation device (PND), Personal Information Manager (PIM), Personal Digital Assistant (PDA), laptop or other suitable mobile device capable of receiving wireless communication and/or navigation signals. Mobile devices also may include devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile devices may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above may also be considered a mobile device.

In various embodiments, proximity may be determined based on the group having common reception of signals in a local area (for example all devices are hearing a certain WiFi access point) and/or by peer-to-peer signaling such as hearing the Bluetooth signal between proximate devices. With these techniques, actual location coordinates are not used, as it is instead determined that members are hearing the same signals. The determination of hearing the same signals is used as a proxy for location coordinates. This means that devices without location capability can participate in the system. The techniques can also be mixed—for example, some of the devices may determine their location using GPS technology, while other devices are simply determined to be in proximity of those devices because they are hearing a common signal such as a WiFi access point.

Figure 2:
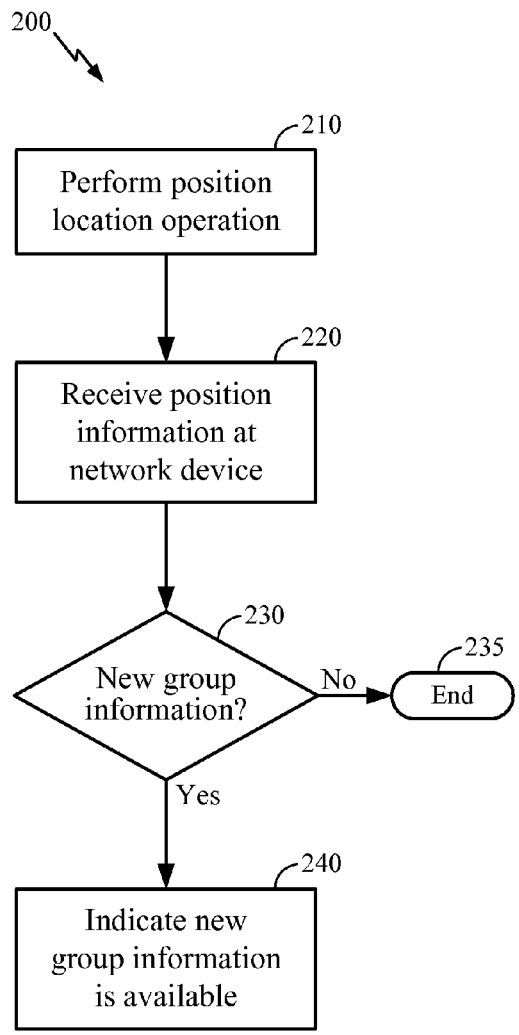
FIG. 2 is a flow diagram of an example of a process for location-enabled group management.

FIG. 2 shows a process 200 that can be used for location enabled group management, according to some embodiments. Referring to FIGS. 1 and 2, at 210, a position location operation can be performed for the mobile device 110. The position location operation can be a satellite positioning operation (e.g., assisted GPS), a terrestrial ranging positioning operation (e.g., Advanced Forward Link Trilateration or other terrestrial operation using terrestrial ranging measurements), or other relatively precise positioning operation. In some implementations, the position location operation may be a simpler operation such as an identification of the serving cell of the mobile device 110, the position of the cell sector center, or other less precise location operation. In different embodiments, the desired precision of the position location operation differs and the techniques that can be used differ accordingly.

At 220, position information is received at the network device 140. The position information may be provided through the user's mobile service provider infrastructure (with appropriate permissions in place, if the network device 140 is external to the service provider), or may be provided by the mobile device 110 (e.g., using SMS or communication with the wireless device 130), in some examples.

At 230, the position information is used to determine whether new group information is implicated. For example, if the mobile device 110 is in close proximity to a point of interest or another person, then the mobile device 110 may be a candidate for a new group, i.e., new group information would be available. In another example, the position information may be compared to a "home" region to determine whether the user is outside the home region. If the user is within his home region, new group information is not implicated, and the process may end at 235 until a new position location operation is performed or other time. If the user is outside this region, and different group information related to the user's existing group attributes is available, new group information may be implicated.

If, new group information is available, at 240 an indicator is provided letting the user know that new group information corresponding to the user's position information is available.

Process 200 can be implemented in a number of ways. For example, for an implementation involving a social networking site such as Facebook™ the new group information can modify the user interface presented when the user logs into his or her Facebook™ account. The user interface can include an indicator that a new location has been detected and include user-selectable options to perform actions related to new group information.

In the example of a Grateful Dead fan traveling to Chicago noted above, the user interface can allow the user to select (perhaps temporary) membership in related groups in the Chicago area, may allow the user to select an option of upcoming events for related groups in the Chicago area, may allow the user to select an option of services related to the group in the Chicago area, or other action. The user may also be provided with the option of indicating a time during which the user is expected to be at that location (e.g., the user indicates that he or she is in Chicago for a week, so he or she can view group-related events scheduled for the upcoming week but not subsequent events).

Other aspects of the current disclosure relate to using groupings to determine locations of interest to a group. One example method uses group members "voting with their feet" via their location information collected in the background via their mobile devices over the course of their normal activities. In some instances, it may take a relatively long time for the activities of an individual to generate meaningful patterns, but in aggregate, the location data generated by a number of people sharing some group attribute(s) may identify those patterns relatively quickly.

In an example implementation, location information from mobile devices of individuals associated by group attributes is aggregated and analyzed using pattern detection algorithms to identify POIs (points of interest) specific to the group. For example, if more than half of the group is co-located within a given period (e.g., a group of soccer moms at a soccer field at the same time), that location would be tagged as a group location that may be used to schedule and map future activities (e.g., next week's soccer game is "Here"). As another example, the system might notice that there has been a large number of visits over an extended period of time to a particular location by members of an interest group (such as collectors of rare jazz recordings). The system notifies a member of that group who is in proximity to that location that there is a group POI nearby, perhaps a used record store with a large selection of rare jazz recordings.

Given the concepts above, group membership attributes can propagate from entity to entity. For example, a group is initially formed by a creator inviting people who are in proximity; the group is named as being a "soccer" interest group; the soccer field is identified as a POI for the soccer group. Later visitors to the soccer field can be identified as members of the soccer group; some of the members may visit another soccer field, causing it to be identified as another soccer related POI, and so forth.

When detecting places of interest by monitoring location patterns of users, time filters can be valuable in some instances. Time filters allow a system to focus on places where one or more users stop and dwell for at least a certain amount of time, and the system can disregard location data that does not meet the specifications of the time filter. Once "dwell locations" are known, the system can analyze which of the dwell locations are common to multiple group members.

Figure 3:
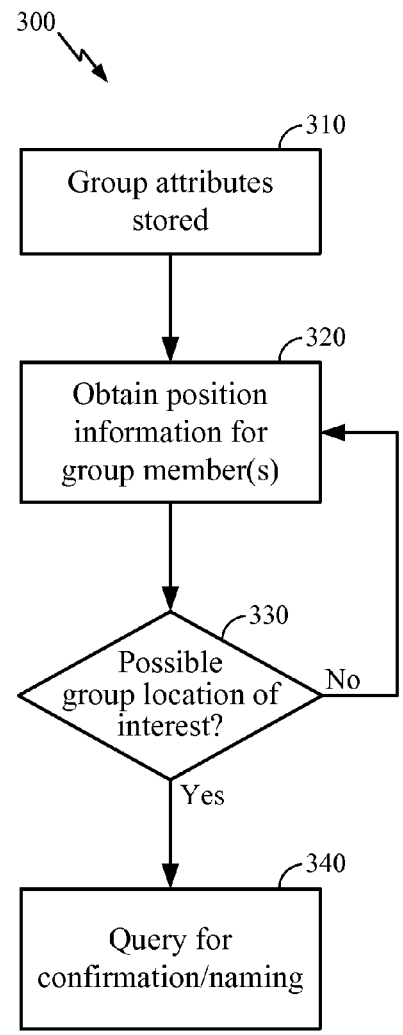
FIG. 3 is a flow diagram of an example of a process for associating group information with particular locations.

FIG. 3 shows an example implementation of a process 300 directed to the above aspect of the disclosure. Referring to FIGS. 1 and 3, at 310, group attributes for multiple users are stored on the network device 140, indicating that the users are part of a particular group (for illustrative purposes, a particular family). At 320, position information is obtained from the mobile devices 110 associated with different family members in an ongoing manner. At 330, the position information is used to determine whether a particular location is implicated as a location of interest to the family. Additionally, time information may aid in the determination that a particular location may be a location of interest, and may be used to provide a preliminary suggestion of a name for the location of interest. At 340, one or more group members is provided with a query requesting confirmation that the position is a position of interest, requesting a name for the location, and/or requesting confirmation of a suggested name.

In an example, the position information for a family can indicate that a particular location is a family residence by noting that the mobile devices of particular family members are generally located at the location at night before powering down and again when the mobile devices are turned on the following morning. A user may be presented with a query (either at the mobile device or when accessing an application via the Internet or other manner) asking if the particular location is a location of interest. The query may ask for a name and/or may present a suggested name to associate with the location. For the current example, the name of the location may be suggested as "[Last name] Home." The user may affirm the suggested name or may use a different name (e.g., may modify the name to be "[First Name, Last Name] Home" when there are different residences corresponding to family members with the same last name). Similarly, pattern recognition may suggest a user's school or office as a location of interest based on the times during which the user is at the location.

Other less standard locations may also be suggested as locations of interest based on pattern recognition. For example, a favorite restaurant may be visited only once a month by a particular family member, but the aggregate group behavior may indicate that the restaurant is a place of interest for the entire family. One or more family members may be queried to determine if the location is a location of interest to the family based on the detected aggregate group behavior. In the example where the location is also a public location such as a business or other known point of interest, the suggested name may be the known name for the location. In some implementations, the location enabled group application may interact with other applications, such as a navigation application, to access related information such as names for points of interest, driving directions, hours of operation, and/or the like.

The above technique can provide group-tailored points of interest that adapt to the behaviors of a group over time. The techniques can apply to many types of groups in addition to families. Using the example of a Grateful Dead fan group again, the aggregate group behavior may indicate that a particular restaurant is a potential point of interest for the group. If the restaurant is a location related to the group, one or more users can indicate the association and create or approve a name for the location. If the restaurant is not related to the group (e.g., it is a popular restaurant that happens to be frequented by group members but is unrelated to group activities), the user(s) may decline to associate the location with the group. In some implementations, the user can designate the location as a personal point of interest, or designate it as a point of interest for a different group (e.g., a family group) instead of or in addition to designating the location as a point of interest for the suggested group.

In another aspect, various embodiments enable group creation using location. To create groups, the initial creation can be performed by a particular person, and then members are added by an administrator or by the users themselves. In other aspects, groups are defined by proximity.

Figure 4:
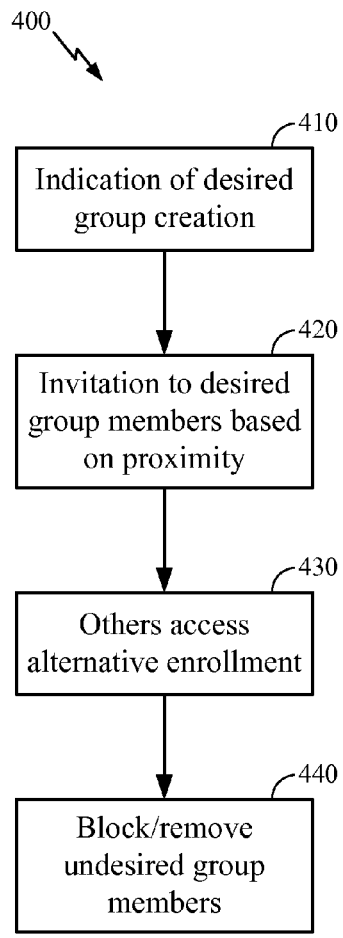
FIG. 4 is a flow diagram of an example of a process for proximity group creation.

FIG. 4 shows a method 400 to create a group using location information. Referring to FIGS. 1 and 4, at 410 a user may indicate that he would like to create a group based on spatial proximity. At 420, a group invitation may be sent to prospective group members based on their proximity to the group creator. At 430, prospective group members who did not receive an invitation (e.g., users without the required location capability or who for some other reason did not receive the invitation) can access the appropriate group application and join the group. At 440, if some unintended users join or attempt to join the group, the group creator can block or remove them from the group membership.

Different techniques can be used to determine who is sent an invitation to join the group. One technique creates a wireless proximity network such as a Bluetooth™ proximity network. Another technique uses the satellite position system derived location or other location reported from mobile devices and employs the location information to suggest group members.

Figure 5:
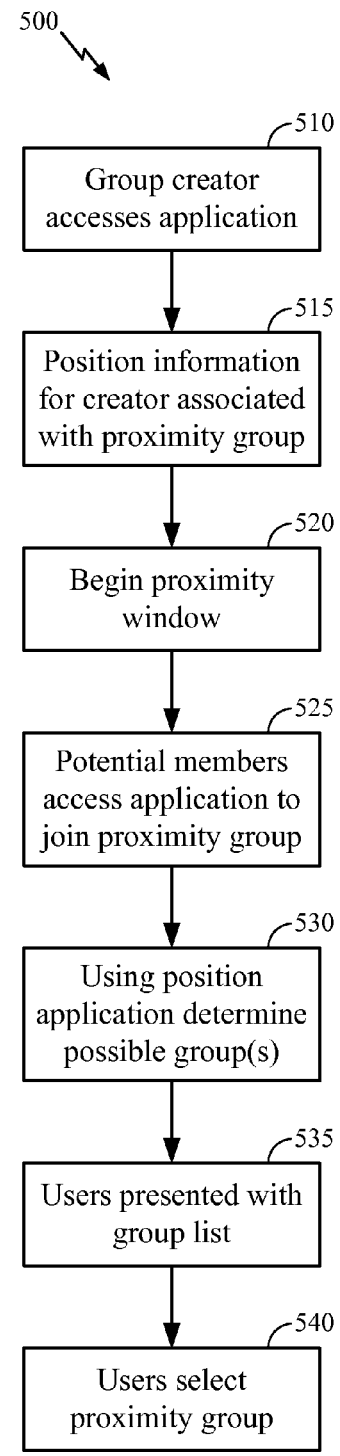
FIG. 5 is a flow diagram of an example of a process for proximity group creation.

Because of technical and privacy issues, techniques that do not require precise location information and do not implicate privacy concerns may provide a benefit. The process 500 of FIG. 5 illustrates an example implementation that allows for proximity group creation and uses some location information, time information, and user opt-in to mitigate those concerns.

At 510, at a first time a group creator accesses an application that allows for proximity group creation and indicates a proximity group is desired. The creator can provide a group name, or the group identifier can be the creator's name, phone number, or other identifier. At 515, position information for the group creator is associated with the proximity group, but need not be highly accurate position information. For example, rather than using information accurate to within a few feet, some embodiments may use position information at the level of granularity of a city, a campus, a county, or other geographical location. At 520, the group creation application starts a membership timer that allows proximate users to join within a proximity window (e.g., a fifteen minute window). The proximity window defines the amount of time potential members can opt into the group based on proximity.

At 525, users who want to join the group access the application and indicate they want to join a proximity group. At 530, the application accesses position information for the users, and determines what proximity groups have been created within the proximity window and within a position uncertainty window of the group creator. At 535, the users are presented with a list of possible proximity groups (perhaps with only the group of interest), and at 540 the users join the group by selecting the appropriate group. Users who do not have mobile device access to the application (or are unable to join at that time for other reasons) can join the group at a later time; e.g., accessing the application via the Internet from home. The above technique mitigates the privacy issues by providing for user opt-in and mitigates the proximity uncertainty issues by limiting the group creation both spatially and temporally. Other options may be provided; for example, users may be provided with the ability to enter location information (instead of or in addition to providing position information based on device positioning techniques), the group creator can have confirmation control of potential members, and/or other options.

Thus, in various embodiments herein, users do not see each other's locations, thereby enhancing privacy. In such embodiments, at most, a group administrator can be shown data regarding proximity to a location and/or proximity to other members (or himself/herself).

In some embodiments, when a point of interest is associated with a group, membership invitations are sent to non-members based solely or in part on such non-members being in proximity to the point of interest. When multiple members are at the point of interest, it can sometimes be assumed that a gathering of the group is occurring, and there is an increased likelihood that other people in proximity are potentially group members. Thus, in another technique, new member invitations are generated when other members are also at the point of interest and a gathering is likely.

The existence of a group in association with a point of interest may be published in a database so that potential members may request available group membership for locations that they visit. The request for membership may be processed in any of a variety of ways, such as being reviewed by an administrator, being subject to additional rules, and/or depending on the security/privacy settings of the group.

In some implementations, an adaptable opt-in proximity window may provide an appropriate proximity window for a given situation. In a particular example, a large group of people is attending a rock concert. People who actually attend the rock concert are offered video, and that content is available for attendees who opt in. Because of the large number of attendees, providing a larger proximity window (more time to opt-in) can help mitigate any bandwidth issues related to many people trying to access a group application using the cellular network at one time. Furthermore, an opt-in window can be defined independently of the proximity window. For example, a person may be allowed to opt-in to a group at any time, or during a longer time window, as long as such person was at the location during the proximity window.

The scope of embodiments is not limited to the examples above, as some embodiments may employ one or more other techniques. For instance, many different spatial and temporal analyses can determine the "affinity" between potential group members. In one example, a system starts with a "strawman" for the area of interest and the timeframe of interest to identify a set of entities that might be formed into a group (entities usually being people, but may also be businesses or other entities that are at or near a place). After a strawman is established, a candidate entity set is determined. Once the candidate entity set is determined, analyses are performed across the locations of the entities and the temporal data for the locations of the entities. A search occurs for "clustering" of locations and/or the times of the locations in the dataset. After clusters are identified, the system detects certain entities whose locations and/or temporal data are not as closely clustered as most of the other entities. Such entities might be eliminated from the candidate set based on system parameters, might be flagged for closer review by administrators than other entities, and/or might be subjected to additional rules to determine membership. On the other hand, clustered members in space and/or time may be recognized as having some affinity. The system may also detect that there are multiple clusters, which may indicate different groups or subgroups. In any event, groups may be formed from the clusters.

Various wireless communication networks based on infrared, radio, and/or microwave technology can be used to implement the described techniques. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SCFDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. Position determination techniques described herein may be implemented in conjunction with various wireless communication networks such as a WWAN, a WLAN, a WPAN, and so on.

Furthermore, various embodiments may employ a satellite positioning system (SPS) for position determination. An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine readable medium to be executed using a processor), hardware (in which functionality is implemented using circuitry such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station, and executed by a processor, for example the microprocessor of a desktop computer, laptop computer, server computer, mobile device, and/or the like. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the features shown herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-executed method for managing a group of entities, the method comprising:
   receiving an indication from a first user indicating a desire to add at least one prospective member to the group based on proximity of the at least one prospective member to a geographic target;
   sending an invitation to the at least one prospective group member, based on a location of the at least one prospective group member, wherein the at least one prospective group member is associated with the geographic target during a predetermined time window; and
   receiving an indication from the at least one prospective group member, in response to the invitation, that the at least one prospective group member desires to join the group.

2. The method of claim 1 in which sending an invitation to the at least one prospective group member comprises:
   creating a list of proximity groups within a position window, the list including, at least, an indication of the proximity groups; and
   sending the list of proximity groups to the at least one prospective group member.

3. The method of claim 2 in which receiving an indication from the at least one prospective group member comprises:
   receiving an indication of a selection of a proximity group from the list of proximity groups, by the at least one prospective group member.

4. The method of claim 1 in which the invitation is limited by a response time window and a position uncertainty window relative to a location of the first user, the at least one prospective group member being located within the position uncertainty window.

5. The method of claim 1 in which receiving an indication from the first user comprises:
   receiving at least one of a group name, identifying information of the first user, and position location information of the first user.

6. The method of claim 1 in which the target comprises one of a point of interest (POI) and a group member location.

7. The method of claim 1 in which the invitation does not reveal a location of the first user.

8. The method of claim 1 in which the first user is not informed of a location of the at least one prospective group member.

9. The method of claim 1 in which the invitation is sent to the at least one prospective group member in response to an indication that the at least one prospective group member is near an established point of interest of the group and an indication that at least one member of the group is also proximate the point of interest.

10. The method of claim 1 in which the group is one of a plurality of proximity groups, and further in which the method comprises:
    creating a strawman for an area and time of interest;
    using the area and time of interest, identifying a set of candidate entities, each of the entities being potential members of at least one of the proximity groups;
    searching for clustering of locations and times associated with the candidate entities; and
    eliminating candidate entities not associated with the clustering and creating the plurality of proximity groups from candidate entities associated with the clustering.

11. A non-transitory tangible machine-readable medium comprising instructions, which, when executed by a machine, cause the machine to perform operations, the instructions comprising:
    code to receive a command from a first mobile device user to add at least one prospective member to a social group using proximity to a geographic target;
    code to provide a membership opportunity to at least a second mobile device user, at least in part, in response to the received command, wherein the at least second mobile device user is associated with the geographic target during a predetermined time window; and
    code to receive input from the at least one second mobile device user indicating a desire to join the social group.

12. The non-transitory tangible machine-readable medium of claim 11 further comprising:
    code for granting membership to the at least one second mobile device user.

13. The non-transitory tangible machine-readable medium of claim 12 in which the code for granting membership includes at least one of:
    code for applying at least one rule to the input from the at least one second mobile device user; and
    code for applying administrator input.

14. The non-transitory tangible machine-readable medium of claim 11 in which the code providing a membership opportunity comprises:
    code applying a response time window to the membership opportunity, the response time window defining a time period in which the opportunity may be acted upon.

15. The non-transitory tangible machine-readable medium of claim 14 in which a length of the response time window is adaptable to a particular context.

16. The non-transitory tangible machine-readable medium of claim 11 in which the code providing a membership opportunity comprises:
    code discerning that the at least one second mobile device user is in a geographical area of proximity to the first mobile device user.

17. A computer system comprising:
    a first module for interacting with a first mobile device user and receiving input from the first mobile device user requesting that the computer system add at least one prospective member to a social group based on proximity to a geographic target;
    a second module interacting with at least a second mobile device user and offering an opportunity for membership in a plurality of social proximity groups, wherein the at least one second mobile device user is associated with the geographic target during a predetermined time window, the plurality of social proximity groups including the social group; and a third module adding the at least one second mobile device user as a member of the social group in response to input from the at least one second mobile device user requesting to join the social group.

18. The computer system of claim 17 comprising a location server configured to track a location of the first mobile device user and a location of the at least one second mobile device user.

19. The computer system of claim 17 comprising:
a server computer with a memory that stores membership attributes associated with the first mobile device user and the at least one second mobile device user.

20. A computer system comprising:
means for interacting with a first mobile device user and receiving input from the first mobile device user requesting that the computer system add at least one member to a social group based on proximity to a geographic target;

means for interacting with at least a second mobile device user and offering an opportunity for membership in a plurality of social proximity groups, wherein the at least one second mobile device user is associated with the geographic target during a predetermined time window, the plurality of social proximity groups including the social group; and means for adding the at least one second mobile device user as a member of the social group in response to input from the at least one second mobile device user requesting to join the social group.

* * * * *